United States Patent
Green et al.

(10) Patent No.: US 9,391,941 B2
(45) Date of Patent: *Jul. 12, 2016

(54) ENHANCED BUDDY LIST INTERFACE

(71) Applicant: AOL Inc., Dulles, VA (US)

(72) Inventors: Mitchell Chapin Green, Boulder, CO (US); Roger Chickering, Granite Bay, CA (US); David Gang, Oakton, VA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,923

(22) Filed: Jul. 17, 2015

(65) Prior Publication Data

US 2015/0358271 A1 Dec. 10, 2015

Related U.S. Application Data

(63) Continuation of application No. 10/715,205, filed on Nov. 18, 2003, now Pat. No. 9,100,218.

(60) Provisional application No. 60/479,918, filed on Jun. 20, 2003, provisional application No. 60/426,815, filed on Nov. 18, 2002.

(51) Int. Cl.
*G06F 3/0481* (2013.01)
*H04L 12/58* (2006.01)
*G06F 3/0482* (2013.01)
*G06Q 10/10* (2012.01)

(52) U.S. Cl.
CPC .............. *H04L 51/24* (2013.01); *G06F 3/0482* (2013.01); *G06Q 10/107* (2013.01); *H04L 12/581* (2013.01); *H04L 51/04* (2013.01)

(58) Field of Classification Search
None
See application file for complete search history.

(56) References Cited

U.S. PATENT DOCUMENTS

| | | |
|---|---|---|
| 5,588,148 A | 12/1996 | Landis et al. |
| 5,694,544 A | 12/1997 | Tamigawa et al. |
| 5,793,365 A | 8/1998 | Tang et al. |
| 5,857,189 A | 1/1999 | Riddle |
| 5,880,731 A | 3/1999 | Liles et al. |
| 5,884,029 A | 3/1999 | Brush, II et al. |
| 5,894,305 A | 4/1999 | Needham |
| 5,933,597 A | 8/1999 | Hogan |
| 5,963,217 A | 10/1999 | Grayson et al. |
| 6,091,410 A | 7/2000 | Lection et al. |
| 6,092,101 A | 7/2000 | Birrell et al. |
| 6,108,688 A | 8/2000 | Nielsen |
| 6,191,807 B1 | 2/2001 | Hamada et al. |
| 6,219,045 B1 | 4/2001 | Leahy et al. |
| 6,253,202 B1 | 6/2001 | Gilmour |
| 6,396,513 B1 | 5/2002 | Helfman et al. |

(Continued)

OTHER PUBLICATIONS

"People Putty;" http://www.haptek.com/products/peopleputty; 5 pages (Dec. 30, 2003).

(Continued)

*Primary Examiner* — Phenuel Salomon
(74) *Attorney, Agent, or Firm* — Finnegan, Henderson, Farabow, Garrett & Dunner, LLP

(57) ABSTRACT

A graphical user interface between a user of a computer service and the computer service includes a list of other users of the computer service selected by the user as significant to the user and an icon associated with one of the other listed users indicating that a communication has occurred between the user and the other user.

24 Claims, 10 Drawing Sheets

(56) References Cited

U.S. PATENT DOCUMENTS

| | | | |
|---|---|---|---|
| 6,466,213 | B2 | 10/2002 | Bickmore et al. |
| 6,480,885 | B1 * | 11/2002 | Olivier ................ H04L 12/1859 709/202 |
| 6,484,196 | B1 * | 11/2002 | Maurille ............. H04L 12/1831 370/260 |
| 6,545,682 | B1 | 4/2003 | Ventrella et al. |
| 6,560,637 | B1 | 5/2003 | Dunlap et al. |
| 6,708,205 | B2 | 3/2004 | Sheldon et al. |
| 6,716,103 | B1 * | 4/2004 | Eck ......................... A63F 13/02 463/40 |
| 6,725,269 | B1 | 4/2004 | Megiddo |
| 6,772,195 | B1 | 8/2004 | Hatelid |
| 6,778,642 | B1 | 8/2004 | Schmidt et al. |
| 6,791,583 | B2 | 9/2004 | Tang et al. |
| 6,820,204 | B1 | 11/2004 | Desai et al. |
| 6,910,186 | B2 | 6/2005 | Kim |
| 6,950,502 | B1 | 9/2005 | Jenkins |
| 7,007,085 | B1 | 2/2006 | Malik |
| 7,035,865 | B2 | 4/2006 | Doss et al. |
| 7,111,232 | B1 | 9/2006 | Bascom |
| 7,123,695 | B2 | 10/2006 | Malik |
| 7,191,239 | B2 | 3/2007 | Rozenfeld et al. |
| 7,225,409 | B1 | 5/2007 | Schnarel et al. |
| 7,295,836 | B2 * | 11/2007 | Yach ..................... H04M 1/725 379/93.17 |
| 7,454,716 | B2 | 11/2008 | Venolia |
| 8,959,164 | B2 * | 2/2015 | Appelman ........... G06Q 10/107 709/202 |
| 2002/0019852 | A1 | 2/2002 | Bahar |
| 2002/0091774 | A1 | 7/2002 | Imamura et al. |
| 2002/0128746 | A1 | 9/2002 | Boies et al. |
| 2002/0130904 | A1 | 9/2002 | Becker et al. |
| 2003/0013483 | A1 | 1/2003 | Ausems et al. |
| 2003/0014477 | A1 | 1/2003 | Oppenheimer et al. |
| 2003/0020749 | A1 | 1/2003 | Abu-Hakima et al. |
| 2003/0023681 | A1 | 1/2003 | Brown et al. |
| 2003/0046296 | A1 | 3/2003 | Doss et al. |
| 2003/0064707 | A1 | 4/2003 | Yoneyama |
| 2003/0145056 | A1 | 7/2003 | Fujisawa et al. |
| 2003/0219104 | A1 | 11/2003 | Malik |
| 2003/0231207 | A1 | 12/2003 | Huang |
| 2003/0233265 | A1 | 12/2003 | Lee et al. |
| 2003/0236832 | A1 | 12/2003 | McIntyre et al. |
| 2004/0019640 | A1 | 1/2004 | Bartram et al. |
| 2004/0039630 | A1 | 2/2004 | Begole et al. |
| 2004/0041836 | A1 | 3/2004 | Zaner et al. |
| 2004/0054735 | A1 | 3/2004 | Daniell et al. |
| 2004/0199515 | A1 | 10/2004 | Penny et al. |
| 2004/0216059 | A1 * | 10/2004 | Vong ..................... G06F 3/1431 715/840 |
| 2005/0117733 | A1 | 6/2005 | Widger et al. |
| 2006/0020677 | A1 | 1/2006 | Von Koch |
| 2006/0041684 | A1 * | 2/2006 | Daniell ................ G06Q 10/107 709/246 |
| 2006/0084450 | A1 | 4/2006 | Dam Nielsen et al. |

OTHER PUBLICATIONS

InterCom Cartoon Chat System; http://www.nfx.com; 11 pages (Dec. 1, 2003).

Kerlow, Isaac V.; The Art of 3D Computer Animation and Effects, Third Edition; John Wiley & Sons, Inc.; pp. 122, 358, 359 (2004).

Kurlander, David et al.; "Comic Chat;" Proceedings of the 23rd Annual Conference on Computer Graphics and Interactive Techniques; ACM Press, New York, NY; pp. 225-236 (1996).

Notification of Transmittal of the International Search Report dated May 10, 2004, International Application No. PCT/US03/36797 (6 pages).

Office Action dated Jan. 26, 2007, U.S. Appl. No. 10/715,207 (14 pages).

Office Action dated Jul. 18, 2007, U.S. Appl. No. 10/715,207 (18 pages).

Salem, B. et al.; "Designing a Non-Verbal Language for Expressive Avatars;" Collaborative Virtual Environments; ISBN: 1-58113-303-0; pp. 93-201 (2000).

Viewpoint: Viewpoint Experience Technology Getting Started; Version 1.1; pp. 1-21; (Jun. 19, 2002).

Viewpoint: Viewpoint Technology Feature Overview; Version 2.0; pp. 1-23; (May 2003).

www.codeproject.com/treectrl/shtree.asp?pring=true; "Sharing folders using tree control drag & drop;" Nov. 26, 2002 (2 pages).

www.microsoft.com/hardware/broadbandnetworking/articles/learn_more/networking_articles/file?share_setup.aspx; "Networking Articles," Nov. 26, 2002 (4 pages).

* cited by examiner

ENHANCED BUDDY LIST INTERFACE

CLAIM OF PRIORITY

This application is a continuation of and claims priority to U.S. patent application Ser. No. 10/715,205, filed on Nov. 18, 2003, which claims priority to U.S. Provisional Application No. 60/426,815, filed on Nov. 18, 2002, and to U.S. Provisional Application No. 60/479,918, filed on Jun. 20, 2003. The entire contents of the above-referenced applications are hereby incorporated by reference.

TECHNICAL FIELD

This disclosure generally relates to electronic communications, and more particularly to an enhanced buddy list interface for electronic communications.

BACKGROUND

Online service providers offer services to enhance their subscribers' online experience. The service provider may provide a subscriber with access to information about news, weather, financial, sports, and entertainment services. Furthermore, the service provider may provide the subscriber with the ability to communicate with other subscribers through a wide variety of different services, such as, for example, email, instant messaging, audio communication services (include telephone networks), video communications (e.g., streaming video services), common calendar services permitting the subscribers to schedule meetings with each other, and automatic communication services that alert one subscriber about the status of another subscriber. Currently, disparate pieces of information relating to a subscriber reside in different applications and services.

SUMMARY

In a first general aspect, a graphical user interface between a user of a computer service and the computer service includes a list of other users of the computer service selected by the user as significant to the user and an icon associated with one of the other listed users indicating that a communication has occurred between the user and the other user.

The graphical user interface can include one or more of the following features. The computer service can include an instant messaging computer service and the list can reflect presence information for each of the other users selected by the user as significant to the user.

The icon can be displayed only if the user selects a representation of the other user in the list of other users. The icon can indicate that an email message has been exchanged between the user and the other user. The icon can indicate that an unread email message has been exchanged between the user and the other user, and can further indicate the number of unread email messages that have been exchanged between the user and the other user. The icon, when selected by the user, can open or activate an application to read the email message or an application listing multiple email messages exchanged between the user and the other user.

The icon can indicate that a calendar event has been scheduled by another user involving both the user and the other user. When selected by the user, the icon can open or activate an application to view the calendar event.

The icon can indicate that a voicemail message has been received by the user from the other user. The icon, when selected by the user, can open or activate an application to access information about the voicemail message. The icon, when selected by the user, can open or activate an application to listen to the voicemail message.

In another general aspect, a computer service is provided to a user. A list of other users of the computer service selected by the user as significant is displayed to the user, and an icon associated with one of the other users is displayed in the list to indicate that a communication has occurred between the user and the other user.

The computer service can include an instant messaging computer service. The icon can be displayed when the user moves a cursor over a representation of the other user in the list of other users. The icon can indicate that an email message has been exchanged between the user and the other user, that an unread email message has been exchanged between the user and the other user, and the number of unread email messages that have been exchanged between the user and the other user. The email message can be displayed in response the selection of the icon by the user. A list of multiple email messages exchanged between the user and the other user can be displayed in response the selection of the icon by the user.

The icon can indicate that a calendar event has been scheduled by another user involving both the user and the other user, and the calendar event can be displayed in response to selection of the icon by the user. The icon can indicate that a voicemail message has been received by the user from the other user, and in response to selection of the icon by the user, information about the voicemail message can be provided or the voicemail message can be played.

The details of one or more implementations are set forth in the accompanying drawings and the description below. Other features will be apparent from the description and drawings, and from the claims.

DETAILED DESCRIPTION

Users of networked online communications applications may communicate and exchange information with other users of the communications application(s). When a user has the capability of communicating with a vast multitude of other users with the communications application(s), the user may select a subset of the other users that are particularly important to the users and identify such users as "buddies." A list of a user's buddies may be stored in a buddy list that is displayed graphically to the user when using the communications application(s), and a graphical user interface (GUI) may be defined that lists the user's buddies and enables the user to communicate with his/her buddies through the GUI-based application (e.g., instant messaging). The functionality of the GUI can be expanded from merely enabling communication with buddies through the GUI-based application to monitoring several other communications applications and reporting on events that have occurred, that are occurring, and/or that will occur in the other applications.

For illustrative purposes, FIGS. 1-6 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
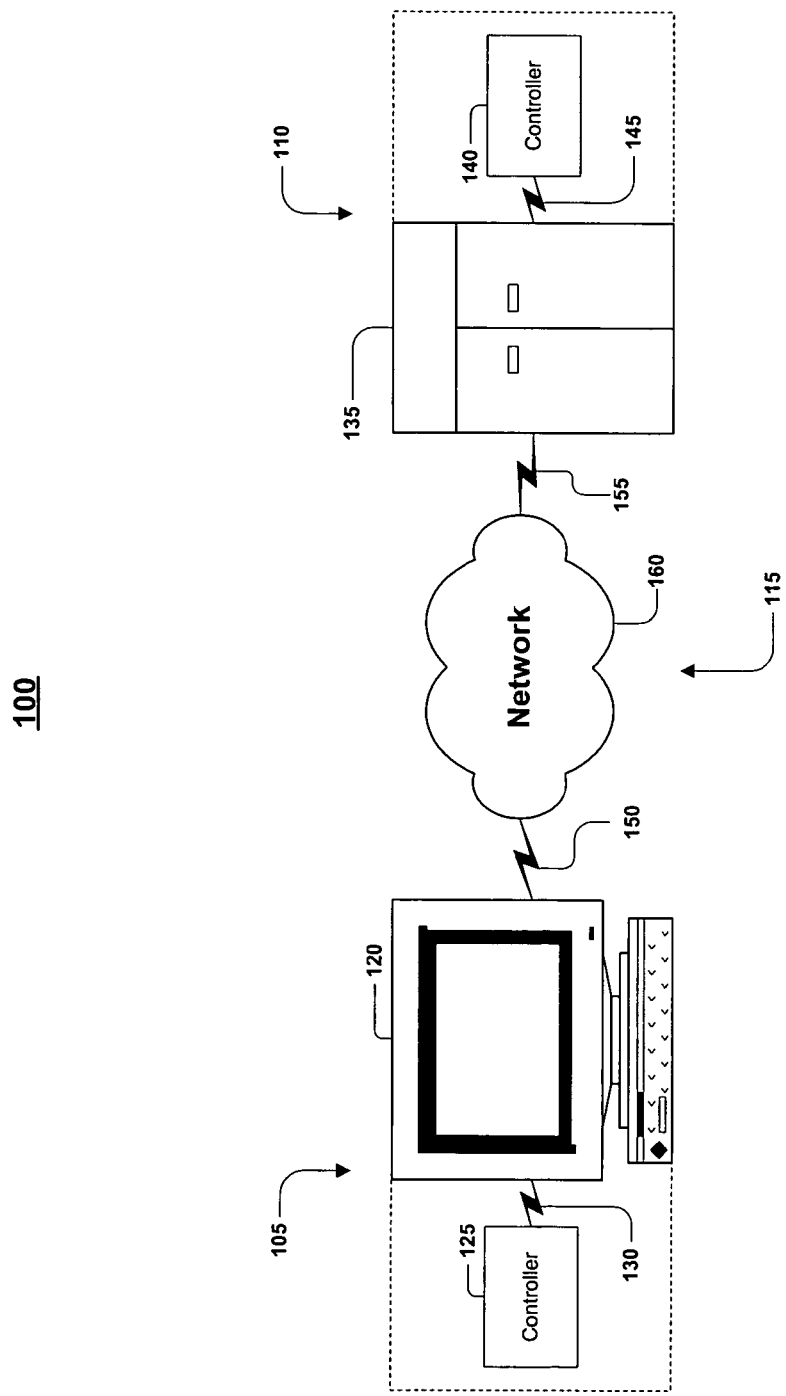
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as, for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a hand-held computer, a mobile telephone, a personal digital assistant ("PDA"), a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g., PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable, or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
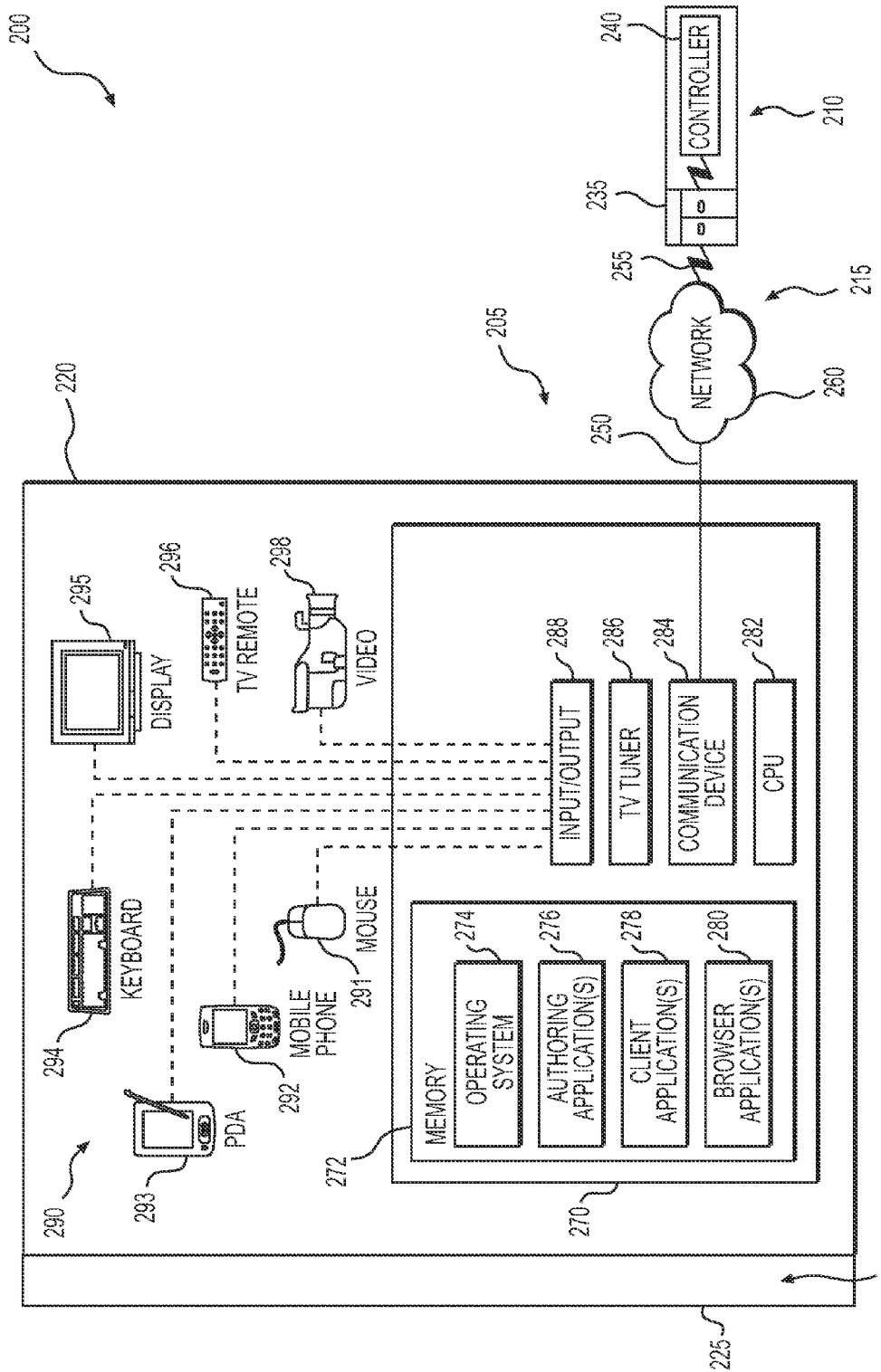
FIGS. 2-5 are block diagrams of expansions of aspects the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows XP™, Windows NT™, OS/2, or Linux) and one or more application programs. Examples of application programs include authoring applications 276 (e.g., word processing, database programs, spreadsheet programs, email program, calendar programs, or graphics programs) capable of generating and/or editing documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape Navigator or Microsoft Internet Explorer) capable of rendering Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically includes a communication device 284 for sending and receiving data. One example of the communication device 284 is a modem. Other examples include a transceiver, a set-top box, a communication card, a satellite dish, an antenna, wireless router, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
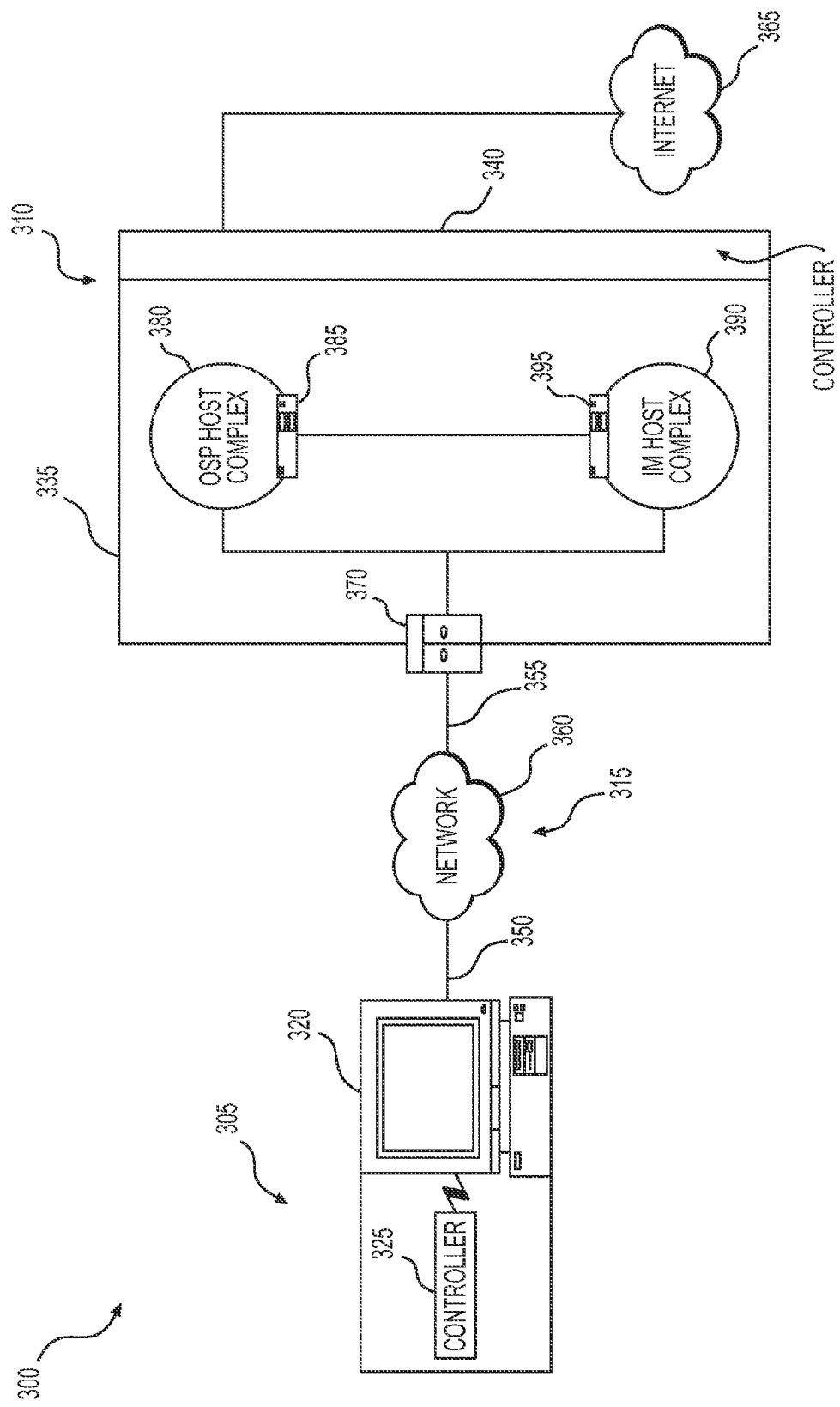

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, such as, for example, an OSP client application and an IM client application. The OSP and IM communication software applications are designed to facilitate the subscriber's interactions with the respective services and, in particular, may provide access to all the services available within the respective host complexes.

Typically, communications using an IM application involve an instantaneous or nearly instantaneous communication between two users, where each user is able to transmit, receive and display communicated information. Additionally, IM communications may involve the display and perception of online presence information regarding other selected users ("buddies"). Examples of IM communications exist over AIM (America Online Instant Messenger), AOL (America Online) Buddy List and Instant Messages, Yahoo Messenger, MSN Messenger, and ICQ, among others. Although discussed below primarily with respect to IM applications, other implementations are contemplated for providing similar functionality in platforms and online applications such as chat, email, and streaming media applications.

Typically, the OSP host complex 380 supports different services, such as email, discussion groups, chat, news services, file storage, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless host communication pathway 375. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

As shown, the client system 305 may access the Internet 365 through the host system 310.

Figure 4:
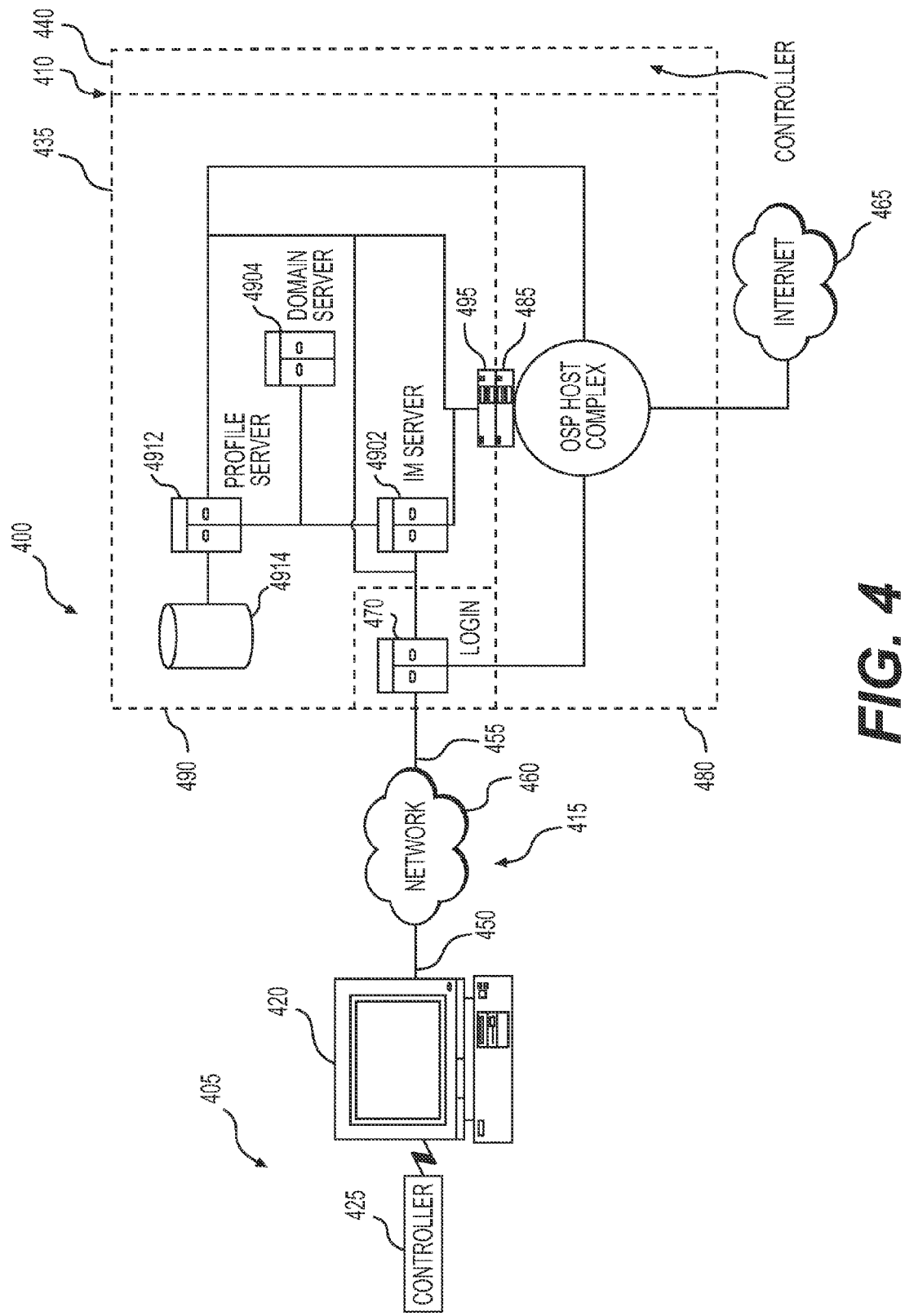

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450 and 455 that enable communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to, and illustrates one possible implementation of, the host systems 110, 210 and 310, shown in FIGS. 1-3, respectively. However, FIG. 4 describes an aspect of the host system 410, focusing primarily on one particular implementation of IM host complex 490. For purposes of communicating with the IM host complex 490, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an IM application for communicating with servers in the IM host complex 490 using exclusive IM protocols. The client controller 425 also may include applications, such as an OSP client application and/or an Internet browser application for communicating with the OSP host complex 480 and the Internet 465, respectively.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

To access the IM host complex 490 to begin an instant messaging session, the client system 405 establishes a connection to the login server 470. The login server 470 typically determines whether the particular subscriber is authorized to access the IM host complex 490 by verifying a subscriber identification and password.

Once a connection to the IM server 4902 has been established, the client system 405 may directly or indirectly transmit data to and access content from the IM server 4902 and one or more associated domain servers 4904. The IM server 4902 supports the fundamental instant messaging services, and the domain servers 4904 may support associated services, such as, for example, administrative matters, directory services, chat and interest groups. In general, the purpose of the domain servers 4904 is to lighten the load placed on the IM server 4902 by assuming responsibility for some of the services within the IM host complex 490. By accessing the IM server 4902 and/or the domain server 4904, a subscriber can use the IM client application to view whether other subscribers of particular importance to the subscriber ("buddies") are online, exchange instant messages with other subscribers, participate in group chat rooms, trade files such as pictures, invitations or documents, find other subscribers with similar interests, get customized news and stock quotes, and search the Web.

In the implementation of FIG. 4, the IM server 4902 is directly or indirectly connected to a routing gateway 4906. The routing gateway 4906 facilitates the connection between the IM server 4902 and one or more alert multiplexors 4908, for example, by serving as a link minimization tool or hub to connect several IM servers to several alert multiplexors. In general, an alert multiplexor 4908 maintains a record of alerts and subscribers registered to receive the alerts.

Once the client system 405 is connected to the alert multiplexor 4908, a subscriber can register for and/or receive one or more types of alerts. The connection pathway between the client system 405 and the alert multiplexor 4908 is determined by employing another hashing technique at the IM server 4902 to identify the particular alert multiplexor 4908 to be used for the subscriber's session. Once the particular multiplexor 4908 has been identified, the IM server 4902 provides the client system 405 with the IP address of the particular alert multiplexor 4908 and gives the client system 405 an encrypted key (i.e., a cookie). The client system 405 then uses the IP address to connect to the particular alert multiplexor 4908 through the communication link 415 and obtains access to the alert multiplexor 4908 using the encrypted key.

The alert multiplexor 4908 is connected to an alert gate 4910 that, like the IM host complex gateway 495, is capable of performing the necessary protocol conversions to form a bridge to the OSP host complex 480. The alert gate 4910 is the interface between the IM host complex 490 and the physical servers, such as servers in the OSP host complex 480, where state changes are occurring. In general, the information regarding state changes will be gathered and used by the IM host complex 490. However, the alert multiplexor 4908 also may communicate with the OSP host complex 480 through the IM gateway 495, for example, to provide the servers and subscribers of the OSP host complex 480 with certain information gathered from the alert gate 4910.

The alert gate 4910 can detect an alert feed corresponding to a particular type of alert. The alert gate 4910 may include a piece of code (alert receive code) capable of interacting with another piece of code (alert broadcast code) on the physical server where a state change occurs. In general, the alert receive code installed on the alert gate 4910 instructs the alert broadcast code installed on the physical server to send an alert feed to the alert gate 4910 upon the occurrence of a particular state change. Upon detecting an alert feed, the alert gate 4910 contacts the alert multiplexor 4908, which in turn, informs the client system 405 of the detected alert feed.

In the implementation of FIG. 4, the IM host complex 490 also includes a subscriber profile server 4912 connected to a database 4914 for storing subscriber profile data. The subscriber profile server 4912 may be used to enter, retrieve, edit, manipulate, or otherwise process subscriber profile data. In one implementation, a subscriber's profile data includes, for example, the subscriber's list of buddies, alert preferences, designated stocks, identified interests, and geographic location. Each buddy in the subscriber's list of buddies ("buddy list") are uniquely identified from all other subscribers (e.g., by an alphanumeric character string, which maybe known as a "screen name"). The subscriber may enter, edit and/or delete profile data using an installed IM client application on the client system 405 to interact with the subscriber profile server 4912. The other subscribers in a subscriber's buddy list generally are selected by or for the user because they have a particular significance or importance to the subscriber. For example, the subscriber may correspond frequently with buddies in the subscriber's buddy list.

Because the subscriber's data is stored in the IM host complex 490, the subscriber does not have to reenter or update the data in the event that the subscriber accesses the IM host complex 490 using a new or different client system 405. Accordingly, when a subscriber accesses the IM host complex 490, the IM server 4902 can instruct the subscriber profile server 4912 to retrieve the subscriber's profile data from the database 4914 and to provide, for example, the subscriber's buddy list to the IM server 4902 and the subscriber's alert preferences to the alert multiplexor 4908. The subscriber profile server 4912 also may communicate with other servers in the OSP host complex 490 to share subscriber profile data with other services. Alternatively, user profile data may be saved locally on the client device 405.

Figure 5:
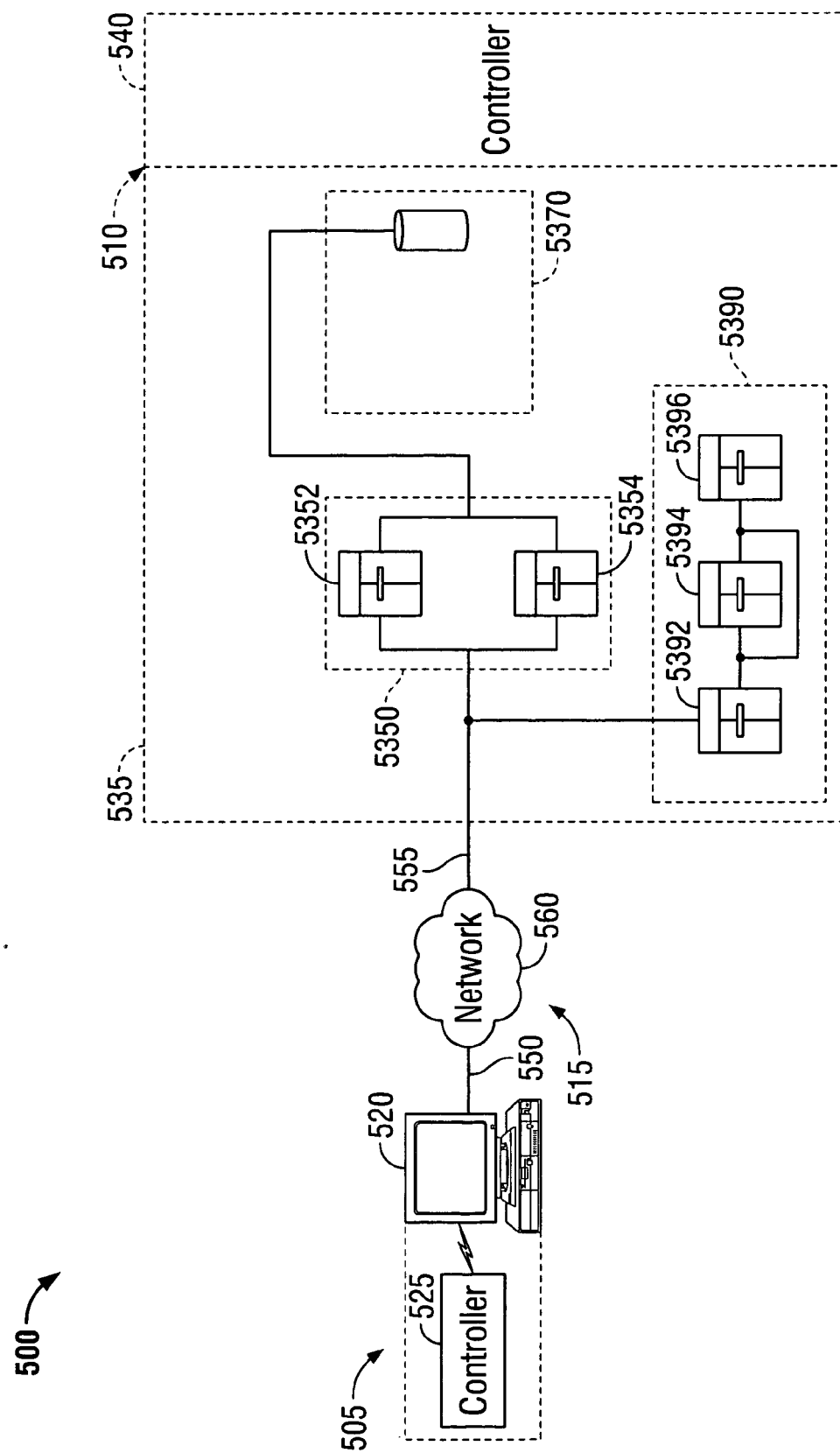

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communication link may include communication pathways 550 and 555 that enable communications through the one or more delivery networks 560. The network 560 may be any known or described delivery network including, but not limited to, a telephone network and/or the Internet.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of the host device 535.

The client system 505 includes a client device 520 and a client controller 525. The client controller 525 is generally capable of establishing a connection to the host system 510 through the delivery network 515. In one implementation, the client controller 525 includes one or more applications, such as an IM application, an OSP application, and/or an Internet browser application.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host device 535 includes a mail gateway 5350 having a send mail server 5352 and a read mail server 5354. The send mail server 5352 is configured to perform functions relating to transmitting electronic data. The read mail server 5354 is configured to perform functions relating to receiving and accessing electronic data. The mail gateway 5350 is in communication with one or more processing servers 5360.

The mail gateway 5350 also is in communication with the storage area 5370 that includes electronic content and attachment database storage. The storage area 5370 includes a system of folders that store electronic data for subscribers of the host system 510.

The host device 535 includes an IM host complex 5390. The IM server 5390 typically has attributes comparable to some or all elements of IM host complexes 390 490 of FIGS. 3 and 4. The IM host complex 5390 includes an e-buddy server 5392 in communication with the client system 505, the read mail server 5352, a look-up server 5394, and an IM server 5396. The IM server 5396 is capable of supporting instant messaging services, the look-up server 5394 is capable of finding subscriber account information (e.g., screen name) from a given email address, and the e-buddy server is 5392 is capable of configuring IM communication between the intended recipient of an email message and the sender and/or other recipients of the email message.

Figure 6:
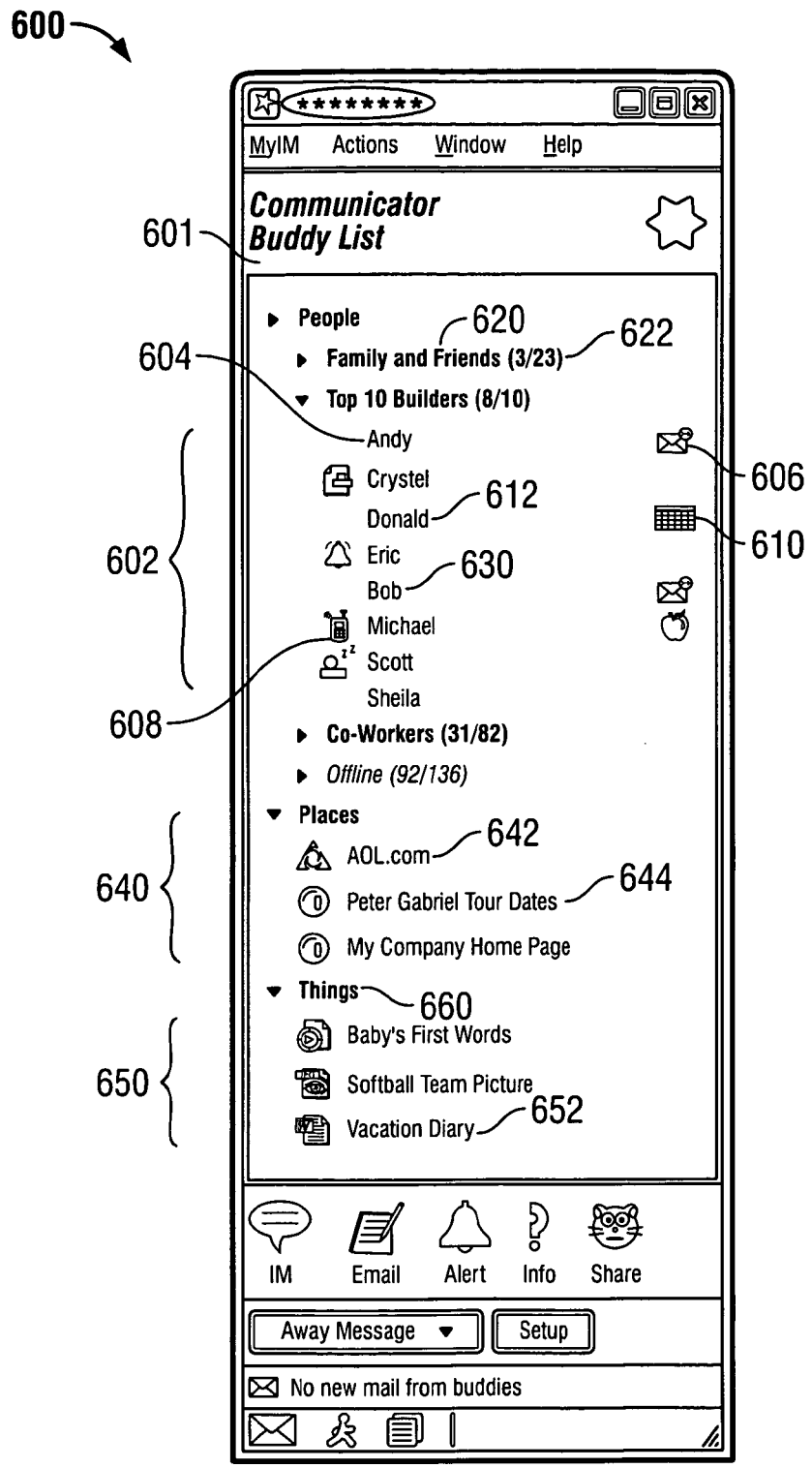
FIGS. 6-7 are illustrations of graphical user interfaces that may be provided by a system, such as the system of FIG. 1.

FIG. 6 illustrates one particular scenario in which the OSP host complex 380 and the IM host complex 390 communicate through one or more OSP host complex gateways 385 and one or more IM host complex gateways 395. In particular, FIG. 6 illustrates one example of a user interface ("UI") 600 that may be presented to a user. In general, the UT 600 is rendered on the user's client system 105 using software stored on the client system. The software for rendering the UI 600 may be downloaded from the host system 110.

As shown, the UT includes a window 601 that displays a list (a "buddy list") 602 identifying one or more of the user's buddies, for example, by the screen name 604 of the buddy. A user may add buddies to his buddy list because they are particularly important to the user (e.g., the user may frequently communicate with a buddy by email, instant messaging, chat, telephone, or other methods). Buddies also can be specially selected for the user (e.g., by a supervisor of the user), because the buddies are deemed to be particularly important to the user (e.g., it is predicted that a user will communicate frequently with a buddy because the user and the buddy have been assigned to work together on a project).

Several different communications between a user and a buddy are possible through the UI 600. For example, a user can initiate an IM dialog with a buddy by selecting the buddy's screen name 604 from the buddy list 602 (e.g. by clicking or otherwise selecting the screen name with a mouse). Selecting the buddy's name establishes a connection from the user's client system 505 through the IM server 5902 and/or the domain name server 5904 to the buddy's client system 505, so that the user and the buddy can, for example, exchange instant messages, participate in group chat rooms.

Figure 8:
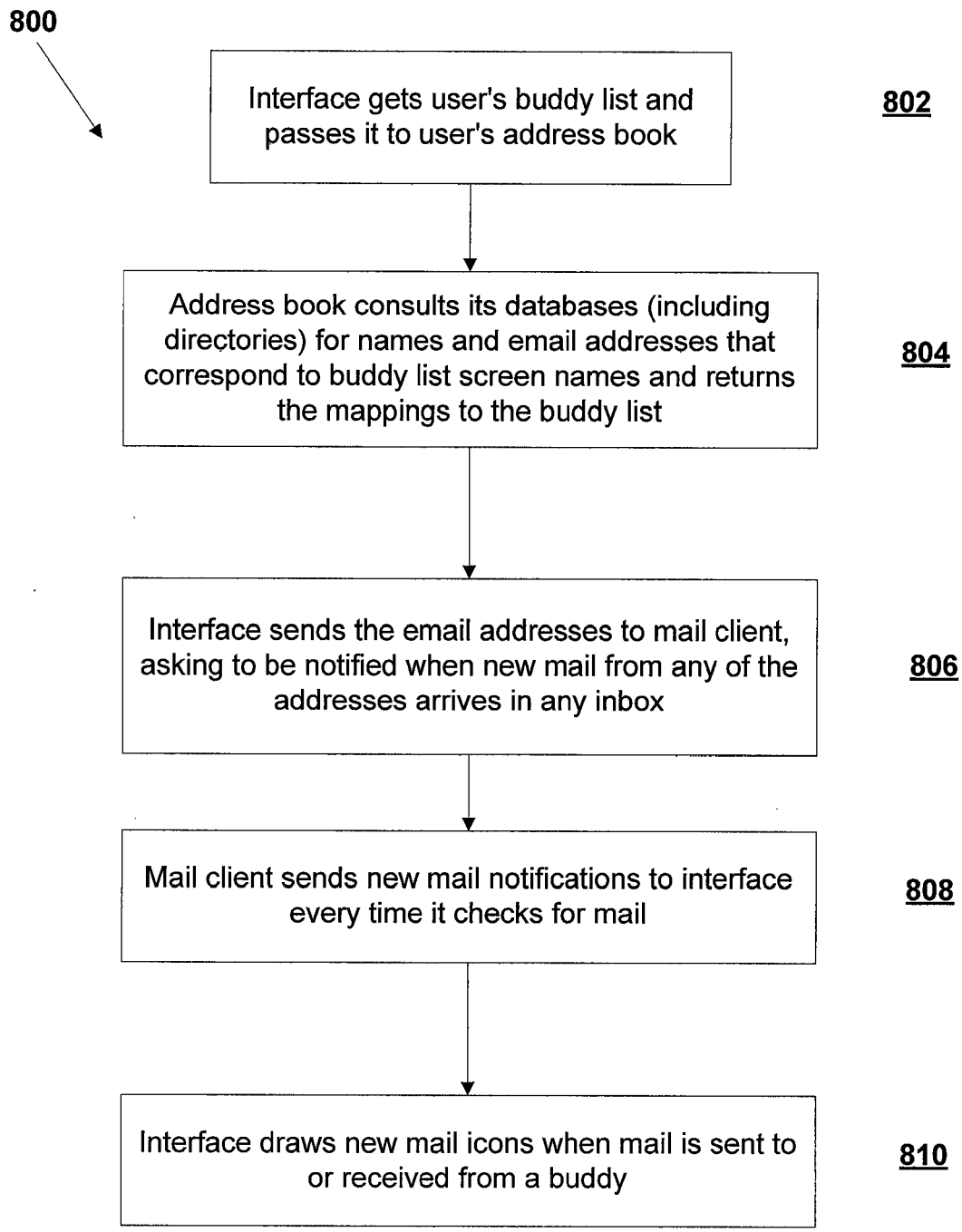
FIGS. 8-10 are flows charts of processes that may be implemented by a system, such as the system of FIG. 1.

A user may also exchange email with a buddy through the UI 600. For example, a user may scroll over the screen name of a buddy and right click or otherwise select on the buddy's screen name to open an application to send email to the buddy. To use UI 600, which lists the user's buddies by screen name, to send email to a buddy's email addresses (or to receive email from one or more of those addresses), a mapping between the screen name and the email address occurs. For example, referring to FIG. 8, such a process 800 begins when the application running UI 600 receives one or more screen names in a user's buddy list and passes the screen names to the application that stores the user's email address book (step 802). Within the address book, a correspondence between a screen name and an email address is then sought (step 804). For example, a correspondence may be found between a buddy's screen name of "Andy" and the email address andy@aol.com. Such a correspondence may be made automatically by software, or the user may be prompted to confirm a suggested correspondence between a screen name and an email address. Databases in addition to an email address book may also be consulted when searching for a correspondence between a buddy's screen name and email address. For example, an electronic Rolodex™ or a database of contacts that stores information about a buddy including the buddy's name, address, telephone numbers, screen name, and email addresses may be consulted to find one or more email addresses that correspond to a user's screen name. Once the email addresses corresponding to the buddies screen names are located, the mappings between screen names and email addresses are returned to the buddy list application and to the UI 600 (step 806). The application running the UI 600 communicates the email addresses to the user's email client and requests to be notified by the email client when a new email is sent to or received from any of the email addresses (step 808). Then, whenever the email client sends or receives an email, it notifies the application running the UI 600 of this fact, such that the UI 600 is updated to present an appropriate mail icon next to the name of the buddy to whom or from whom mail has been sent (step 810).

Referring again to FIG. 6, when the application running the UI 600 receives a notification that an email message has been received from a buddy, a mail icon 606 is displayed in the window 601 next to the buddy's screen name 604 to indicate that email has been received from the buddy. The mail icon can be, for example, an image of the back (return address) side of a envelope. When the user scrolls over the mail icon 606 with a mouse, information about the email received from the buddy (e.g., the number of unread emails received from the buddy, the date and time the email was send and the subject of the email) is displayed to the user. Similarly, when mail is sent to the buddy, the icon may be an image of the front (recipient's address) side of an envelope. The mail icon 606 can be displayed until all mail received from the buddy and all mail sent to the buddy has been read.

Figure 7:
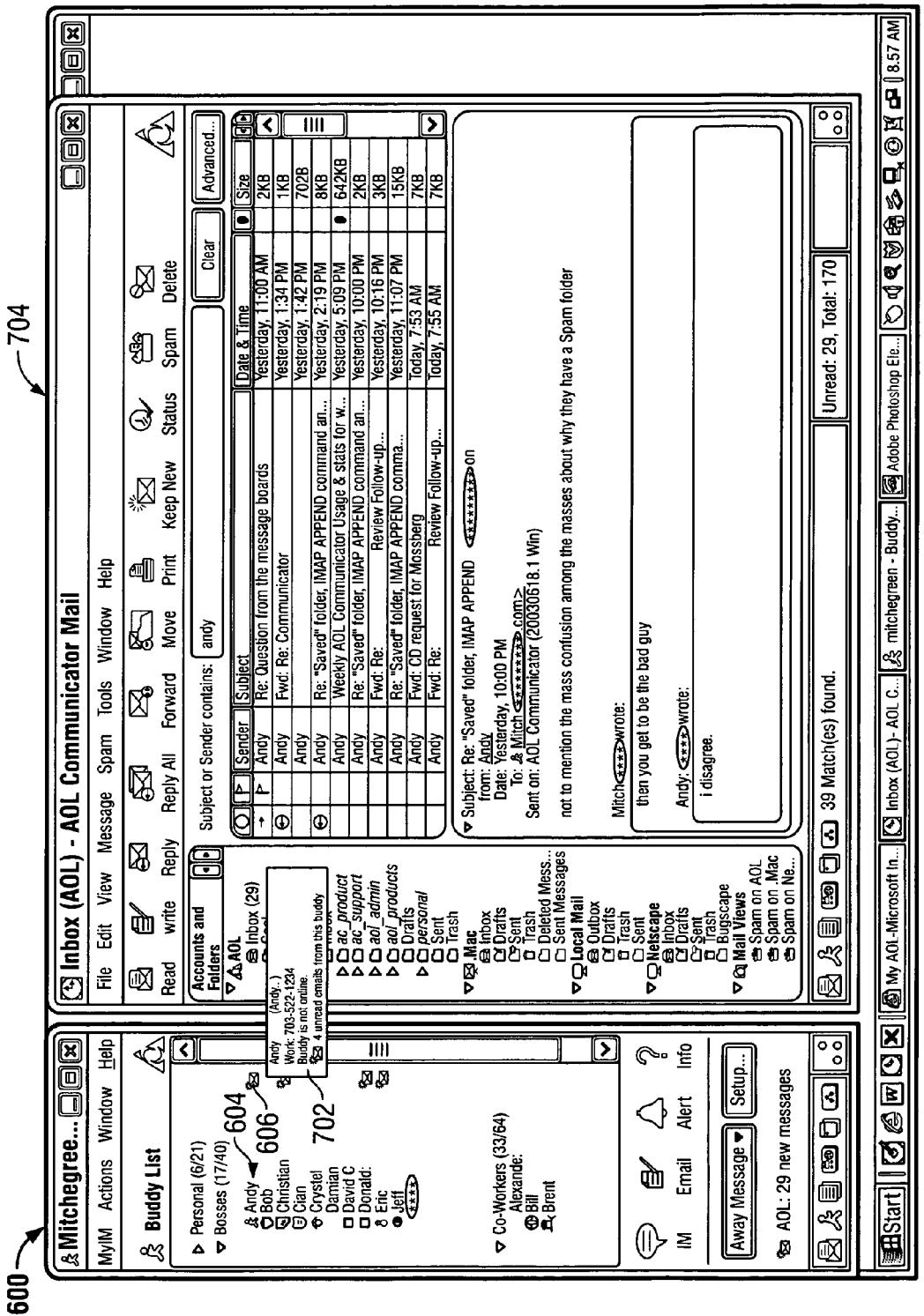

Referring to FIG. 7, when the user moves the cursor over a mail icon 606 associated with the screen name 604 of a buddy in the UI 600, information about the buddy and the mail sent by the buddy is displayed by one or more supplemental interfaces 702 (e.g., a window or dialog, a tooltip, or a fly-out panel known as a quick access panel ("QAP")). Such information may include the buddy's real name, telephone number, whether the buddy is online and how many unread messages the user has received from the buddy. By double clicking on (or otherwise selecting) the mail icon 606, the user can open or activate an email application UI 704 listing all emails received from and/or sent to the buddy associated with the mail icon 606. When the email application UI 704 is activated, it can automatically display the oldest unread message sent from the buddy to the user in a window 706.

Figure 9:
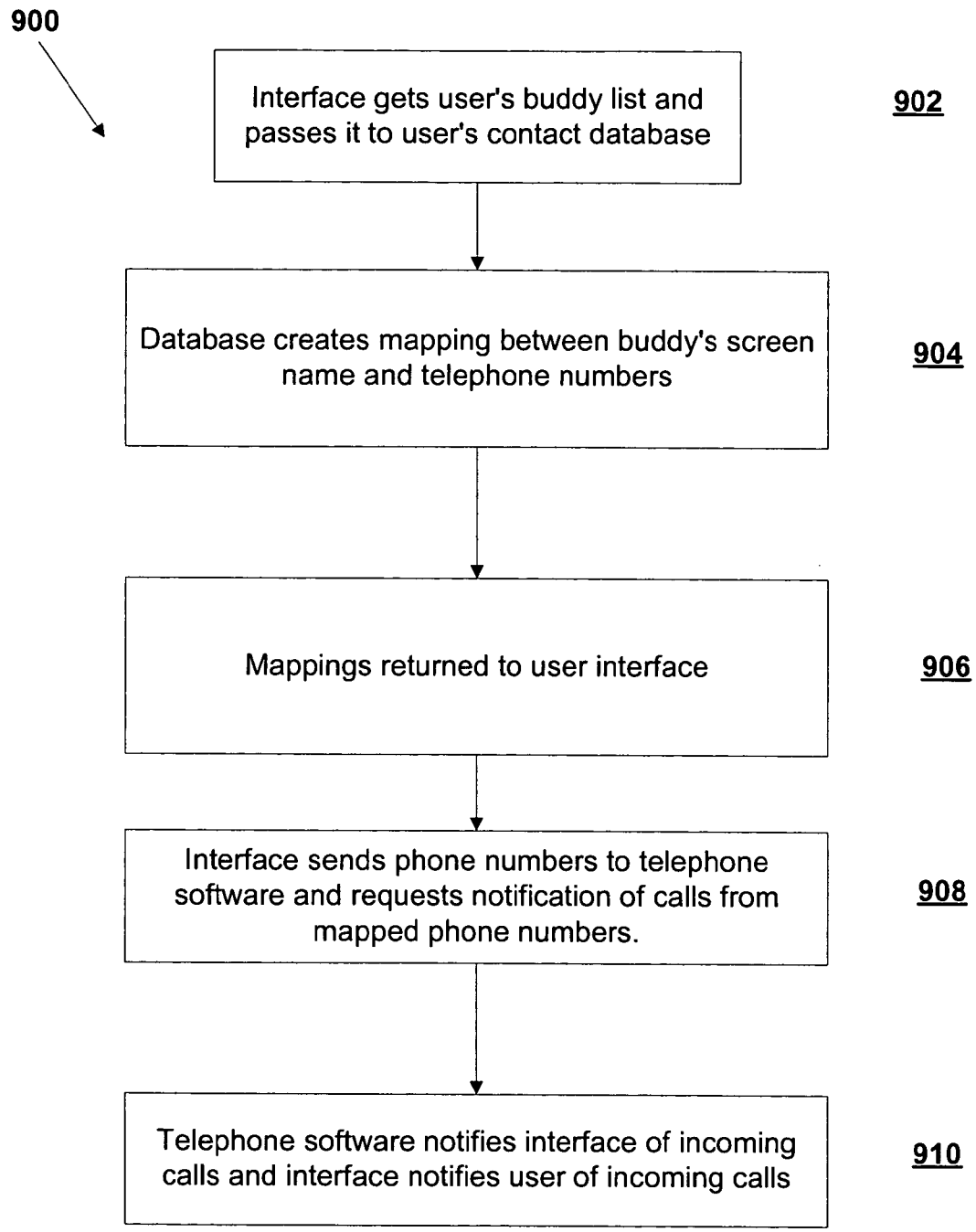

Referring again to FIG. 6, a user may communicate by telephone with a buddy through the UI 600. For example, a user may scroll over the screen name of a buddy and right click or otherwise select the buddy's screen name to open an application to dial a phone number associated with the buddy. To use UI 600, which lists the user's buddies by screen name, to telephone a buddy, a mapping between the screen name and the phone number occurs. For example, referring to FIG. 9, such a process 900 begins when the application running UI 600 receives the screen names in a user's buddy list and passes the list of screen names to a database application that stores the contact information for the user's buddies (step 902). The database application creates a correspondence between a buddy's screen name and one or more phone numbers associated with the buddy (step 904). Such a correspondence may be made automatically by software, or the user may be prompted to confirm a suggested correspondence between a screen name and one or more phone numbers of the buddy. Once the phone number(s) corresponding to the buddies' screen names are located, the mappings between screen names and phone number(s) are returned to the buddy list application and to the UT 600 (step 906). The software running the UI 600 then communicates the phone number(s) to the user's telephone software, and requests to be notified by the telephone software when a voicemail is received from any of the phone numbers (step 908). Then, whenever a phone call or voicemail is received from one of the listed phone numbers, the telephone software notifies UI 600 of this fact, and UI 600 presents a new telephone call icon next to the name of the buddy from whom the voicemail has been received. (step 910).

Referring again to FIG. 6, when the UI 600 receives a notification that a phone call or a voicemail has been received from a buddy, a telephone icon 608 may be displayed in the window 601 next to the buddy's screen name 604 to indicate that a phone call or voicemail has been received from the buddy. The telephone icon can be, for example, an image of a telephone. Alternatively, when the UI 600 receives a notification that a phone call has been received from a buddy, an email icon 606 may be displayed in the window 601 next to the buddy's screen name 604 to indicate that a phone call has been received from the buddy. When the user scrolls over the telephone icon 608 or the email icon 606 with a mouse, information about the telephone calls received from the buddy is displayed to the user (e.g., the number of phone calls received from the buddy, the date and time at which the phone calls were received, whether voicemail messages were left by the buddy, and how many voicemail messages were left by the buddy). By double clicking or otherwise selecting the telephone icon 608, the user can open an audio streaming application to play a recording of the voicemail message(s) left by the buddy or a text reading application to read a transcription of, or other information about, the voicemail message(s). By double clicking, or otherwise selecting, the email icon 606, the user can open an email application for information about the call, including, for example, the name of the caller, the phone number from which the call originated, the time of the call, and a transcript of the call.

As an alternative to the client-side voicemail notification process described above, the voicemail notification process may be implemented on the host side of the communications system 100. For example, a first user can subscribe to a voicemail service provided by the host, and the first user's address book can include a second user's screen name and phone number. The second user can record a voicemail message for the first user on the host system. The host system then notifies the first user of the voicemail message by sending the first user an email message with a subject line containing information about the call (e.g., the name and phone number of the caller and the time of the call) and a sound recording of the voicemail message as an attachment to the body of the email message. When the email message arrives at the mail client on the host system, the mail client parses the subject line for the phone number of the caller and passes the phone number to the address book of the first user. The address seeks a matching phone number among its records, and if a match exists, the address book application notifies the instant messaging application and instructs the UI 600 to place an email icon 606 and or a phone icon 608 next to the second user's screen name in the UI 600. When the first user select the email icon 606 or the phone icon 608, an email application is activated to display the email message about the voice mail to the first user.

A user and/or a buddy may schedule calendar events for each other through the UI 600. For example, a user may scroll over the screen name of a buddy and right click or otherwise selecting the buddy's screen name to open a calendar scheduling application to schedule a calendar event (e.g., a meeting) for the buddy. To use UI 600, which lists the user's buddies by screen name, to schedule a calendar event for the buddy, a mapping between the buddy's screen name and buddy's name occurs. This mapping is similar to the mapping between the buddy's screen name and email address described above with reference to FIG. 8 and to the mapping between the buddy's screen name and telephone numbers described above with reference to FIG. 9. This mapping is accomplished though automatic or semi-automatic communications between the software running the UI 600 and the software running a common calendar accessible to both the user and the user's buddies. Then, whenever a calendar event involving the user and the buddy is scheduled, the calendar software notifies the UI 600 of this fact.

When the UI 600 receives a notification that a calendar event has been scheduled between the user and a buddy, a calendar icon 610 is displayed in the window 601 next to the screen name 612 of the buddy with whom the calendar event has been scheduled. The calendar icon 610 can be, for example, an image of a calendar page. When the user scrolls over the calendar icon 610 with a mouse, information about the calendar events related to the buddy is displayed to the user (e.g., the number of calendar events concerning the buddy, the date and time of a calendar event, who scheduled the calendar event, and who has confirmed attendance at the calendar event). By double clicking or otherwise selecting the calendar icon 610 the user can open a common calendar application, with which to view calendar events concerning the user and the buddy.

The window 601 that displays the buddy list 602 can group the buddies in categories according to how they are known to the user (e.g., "Family and Friends," "Top 10 Buddies," "Co-Workers," and "Offline" buddies). A tally of the total number of buddies in a category and the number of on-line buddies can be kept next to a heading identifying the category. For example, in the category of "Family and Friends" 620, a tally 622 identifies that three of the 23 total buddies in the category are currently on-line. The screen name of buddy may also identify whether the buddy is on-line of off-line. For example, the screen name of buddy listed in normal italic weight font 604 indicates that the buddy is on-line, whereas the screen name of buddy listed in normal weight font 630 indicates that the buddy is off-line.

When the user moves the cursor over the screen name 604 of a buddy, information about the buddy is displayed by one or more supplemental interfaces, such as, for example, a window or dialog, a tooltip, or a QAP. The supplemental information may include information that the user has collected about the buddy, information reflecting the user's past relationship with the selected buddy, and status information reflecting aspects of the user's current and future relationship with the buddy. The information collected about the buddy may include the buddy's full name, phone numbers, screen name, and other data about the buddy extracted from the user's address book. If the user's address book does not have an address book entry for the buddy, the supplemental interface provides a way to add one. The status information about the buddy may include various views of email messages received from the buddy (e.g., unread messages, all received messages, or total mail count), calendar events, alerts, on-line presence state, chat presence, buddy icons, and links to additional buddy information).

The window 601 of the UI 600 includes a list 602 of the user's buddies, a list of some of the user's favorite places 640, and a list of the user's favorite things 650. Some features of the buddy list 602 have been described above.

The favorite places list 640 includes a list of the user's favorite links 642 to other information. Although favorite links 642 commonly are webpage URLs accessible through a browser application, favorite links 642 can be any kind of uniform resource identifier for identifying and retrieving content from a network through any network protocol (e.g. ftp, Gopher, telnet, https). By move the cursor over and clicking or otherwise selecting a link 642, the user may open a supplemental interface to display the information. The information may be displayed in a traditional web browser but may also be displayed in a window or dialog, a tooltip, or a QAP. Thus, the favorite places list 640 of UI 600 provides a place to store the user's favorite links to additional information within a window 601 that includes the screen names of the user's buddies.

Figure 10:
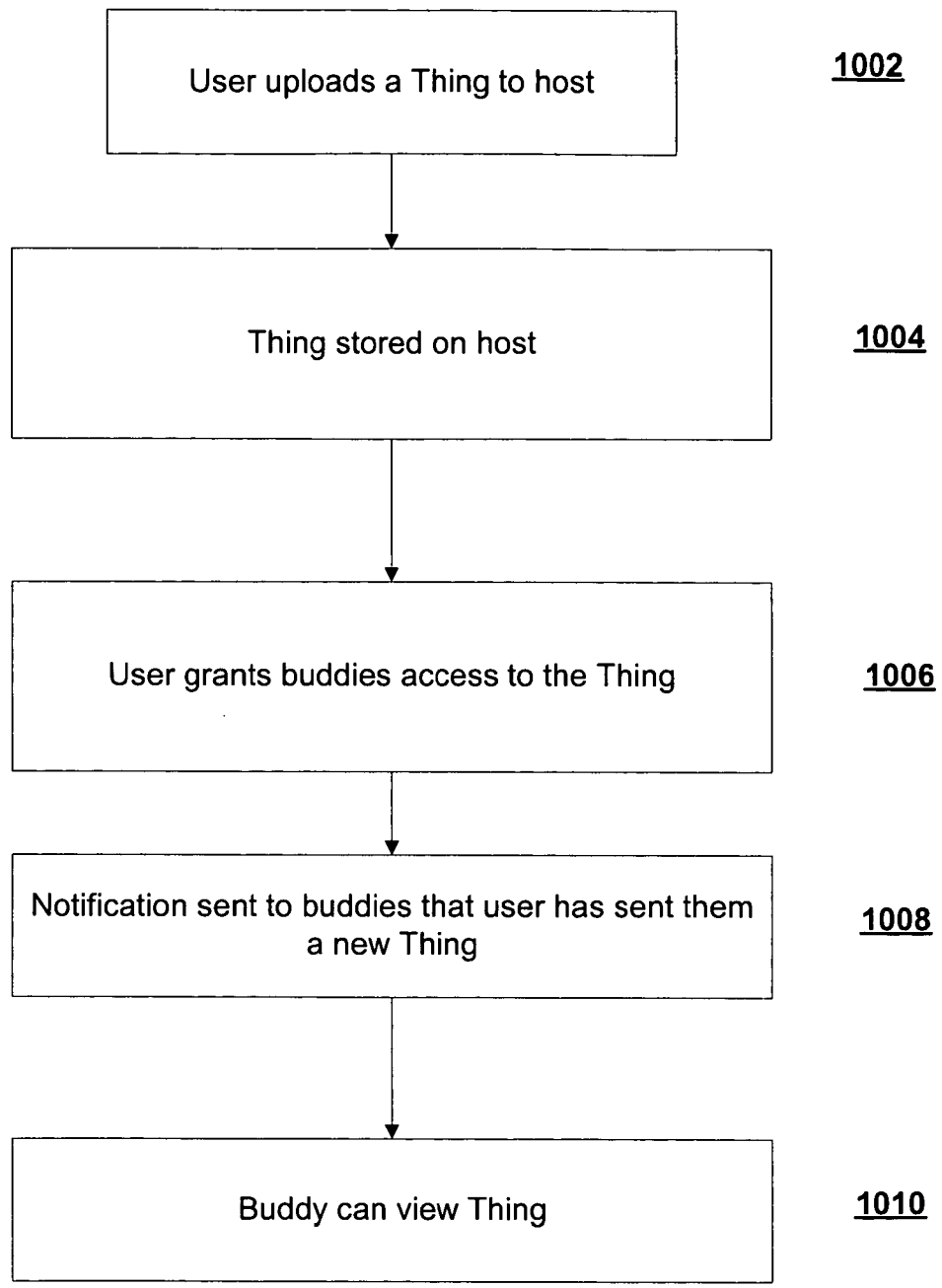

The favorite things list 650 indicates a list of selected resources that the user stores on the host system 110, such as, for example, text files, image files, audio files, and a calendar of appointments. Referring to FIG. 10, to make use of things stored on the host system 110, the user first uploads a thing from the client system 105 to the host system 110 (step 1002). The user may upload a thing by using tools within the UI 600. For example, a user may right click (or otherwise select) the "things" label within window 601 to open a supplemental interface for selecting a thing stored on the client system 105, and may use the supplemental interface to initiate a transfer of the thing from the client system 105 to the host system 110.

Once uploaded to the host system 110, the thing is stored on a storage medium of the host system where it is accessible to the user (step 1004), and thereafter, the thing 652 is accessible to the user within the favorite things list 640 within window 601 of UI 600, which makes the thing accessible to the user from any client system 105 with which the user may access the host system 110.

After a thing is uploaded and stored on the host system, the user can grant access to the thing to one or more of the user's buddies (step 1006). A user may right click (or otherwise select) the thing 652 as represented in window 601 of UI 600 to open a supplemental interface in which the user can enter the screen names of buddies that are allowed to access the thing 652. When a user grants a buddy access to a thing 652, a notification may be sent to the buddy that the user has granted access to the thing (step 1008). The notification may be presented to the buddy in the form of a icon representing a "new thing" or as an email icon 606 to the right of the user's screen name in the buddy's buddy list. The buddy can then click or otherwise select the new thing icon to open the thing (step 1010), or the user can click or otherwise select the email icon 606 to open an email containing the new thing as an attachment or containing a link to the new thing. When the user moves a cursor over the thing in the UI 600, a list of the buddies who have been granted access to the thing can be presented to the user. The list may include a date when the thing was shared with each buddy in the list, may specify the type of access that the user granted to the each buddy, and may specify when the thing was modified and by whom. Similarly, when the user moves a cursor over the screen name 604 of a buddy in the UI 600, a list of the things that have been shared with the buddy can be presented to the user. The list may include a date when each thing in the list was shared with the buddy and may specify the type of access the buddy was granted to each thing.

The list of buddies with whom a thing has been shared and/or the list of things that have been shared with a buddy can be presented in a supplemental interface.

The user can control the degree of access a buddy has to the thing. For example, the user may grant "read only" access to the thing, permitted the buddy to open and view the thing but not to modify the thing, or the user can grant "modify" access to the thing to permit the buddy to open, modify, and restore the modified version of the thing on the host system 110. If the buddy makes a modification to the thing 652 and stores it again on the host system 110, a "new thing" notification is sent to all the buddies that have access to the thing to inform them that the thing has been modified. The host system 110 can store only the updated, modified thing 652, or can store all versions of modified things, so that buddies and the original user can track the evolution of a thing. The buddies with access in the list can be shown in the UI 600 in different ways depending on the degree of access they have. For example, buddies with modify access may be shown in bold font, while buddies with read access may be shown in regular font.

The general aspects described above relate to instant messaging and email as well as other forms of communication such as, for example, telephonic communication (e.g., mobile phones, and pagers). Other implementations are within the scope of the following claims.

What is claimed is:

1. A computer-implemented method for providing message notifications to a user, the method comprising the following operations performed with one or more processors:
    displaying, to a user of an instant messaging system, a graphical user interface comprising a window that includes a contacts list listing identifiers corresponding to multiple co-users of an instant messaging service;
    monitoring when a message of type different from an instant message is received from a first one of the co-users;
    determining a total number of messages of a different type sent by the first one of the co-users to the user that remain unattended by the user; and
    displaying, within the window that includes the contacts list and in association with the identifier corresponding to the first co-user, a graphical element that indicates that one or more unattended messages of a different type have been sent by the first co-user to the user and remain unattended by the user.

2. The computer-implemented method of claim 1, further comprising:
    displaying, in response to selection of the graphical element by the user, an indication of the number of messages of a different type that remain unattended by the user.

3. The computer-implemented method of claim 1, further comprising:
    activating, in response to selection of the graphical element by the user, an application to attend to the one or more unattended messages.

4. The computer-implemented method of claim 1, wherein the different types of messages include at least one type selected from the group consisting of email message, voicemail message, telephone call, and calendar event.

5. The computer-implemented method of claim 1, wherein:
    monitoring when a message of type different from an instant message is received from a first one of the co-users comprises monitoring when an email message is received from a first one of the co-users;
    determining a total number of messages of a different type sent by the first one of the co-users to the user that remain unattended comprises determining a total number of email messages sent by the first one of the co-users to the user that remain unattended by the user; and
    displaying a graphical element that indicates that one or more unattended messages of a different type have been sent by the first co-user to the user and remain unattended by the user comprises displaying a graphical element that indicates that one or more email messages have been sent by the first co-user to the user and remain unattended by the user.

6. The computer-implemented method of claim 1, wherein:
    monitoring when a message of type different from an instant message is received from a first one of the co-users comprises monitoring when a voicemail message is received from a first one of the co-users;
    determining a total number of messages of a different type sent by the first one of the co-users to the user that remain unattended comprises determining a total number of voicemail messages received by the user from the first co-user that remain unattended by the user; and
    displaying a graphical element that indicates that one or more unattended messages of a different type have been sent by the first co-user to the user and remain unattended by the user comprises displaying a graphical element that indicates that one or more voicemail messages have been received by the user from the first co-user and remain unattended by the user.

7. The computer-implemented method of claim 1, wherein:
    monitoring when a message of type different from an instant message is received from a first one of the co-users comprises monitoring when a telephone call is received from a first one of the co-users;
    determining a total number of messages of a different type sent by the first one of the co-users to the user that remain unattended comprises determining a total number of telephone calls received by the user from the first co-user that remain unattended by the user; and displaying a graphical element that indicates that one or more unattended messages of a different type have been sent by the first co-user to the user and remain unattended by the user comprises displaying a graphical element that indicates that one or more telephone calls have been received by the user from the first co-user and remain unattended by the user.

8. The computer-implemented method of claim 1, wherein:

monitoring when a message of type different from an instant message is received from a first one of the co-users comprises monitoring when a calendar event is received from a first one of the co-users;

determining a total number of messages of a different type sent by the first one of the co-users to the user that remain unattended comprises determining a total number of calendar events sent by the first one of the co-users to the user that remain unattended by the user; and displaying a graphical element that indicates that one or more unattended messages of a different type have been sent by the first co-user to the user and remain unattended by the user comprises displaying a graphical element that indicates that one or more calendar events have been sent by the first co-user to the user and remain unattended by the user.

9. A system for providing message notifications to a user, comprising:

a memory that stores instructions;

at least one processor coupled to the memory and configured with the instructions to:

display, to a user of an instant messaging system, a graphical user interface comprising a window that includes a contacts list listing identifiers corresponding to multiple co-users of an instant messaging service;

monitor when a message of type different from an instant message is received from a first one of the co-users;

determine a total number of messages of a different type sent by the first one of the co-users to the user that remain unattended by the user; and display, within the window that includes the contacts list and in association with the identifier corresponding to the first co-user, a graphical element that indicates that one or more unattended messages of a different type have been sent by the first co-user to the user and remain unattended by the user.

10. The system of claim 9, wherein the at least one processor is further configured to:

display, in response to selection of the graphical element by the user, an indication of the number of messages of a different type that remain unattended by the user.

11. The system of claim 9, wherein the at least one processor is further configured to:

activate, in response to selection of the graphical element by the user, an application to attend to the one or more unattended messages.

12. The system of claim 9, wherein the different types of messages include at least one type selected from the group consisting of email message, voicemail message, telephone call, and calendar event.

13. The system of claim 9, wherein:

monitoring when a message of type different from an instant message is received from a first one of the co-users comprises monitoring when an email message is received from a first one of the co-users;

determining a total number of messages of a different type sent by the first one of the co-users to the user that remain unattended comprises determining a total number of email messages sent by the first one of the co-users to the user that remain unattended by the user; and displaying a graphical element that indicates that one or more unattended messages of a different type have been sent by the first co-user to the user and remain unattended by the user comprises displaying a graphical element that indicates that one or more email messages have been sent by the first co-user to the user and remain unattended by the user.

14. The system of claim 9, wherein:

monitoring when a message of type different from an instant message is received from a first one of the co-users comprises monitoring when a voicemail message is received from a first one of the co-users;

determining a total number of messages of a different type sent by the first one of the co-users to the user that remain unattended comprises determining a total number of voicemail messages received by the user from the first co-user that remain unattended by the user; and displaying a graphical element that indicates that one or more unattended messages of a different type have been sent by the first co-user to the user and remain unattended by the user comprises displaying a graphical element that indicates that one or more voicemail messages have been received by the user from the first co-user and remain unattended by the user.

15. The system of claim 9, wherein:

monitoring when a message of type different from an instant message is received from a first one of the co-users comprises monitoring when a telephone call is received from a first one of the co-users;

determining a total number of messages of a different type sent by the first one of the co-users to the user that remain unattended comprises determining a total number of telephone calls received by the user from the first co-user that remain unattended by the user; and displaying a graphical element that indicates that one or more unattended messages of a different type have been sent by the first co-user to the user and remain unattended by the user comprises displaying a graphical element that indicates that one or more telephone calls have been received by the user from the first co-user and remain unattended by the user.

16. The system of claim 9, wherein:

monitoring when a message of type different from an instant message is received from a first one of the co-users comprises monitoring when a calendar event is received from a first one of the co-users;

determining a total number of messages of a different type sent by the first one of the co-users to the user that remain unattended comprises determining a total number of calendar events sent by the first one of the co-users to the user that remain unattended by the user; and displaying a graphical element that indicates that one or more unattended messages of a different type have been sent by the first co-user to the user and remain unattended by the user comprises displaying a graphical element that indicates that one or more calendar events have been sent by the first co-user to the user and remain unattended by the user.

17. A non-transitory, computer-readable storage medium including instructions that are executed by at least one processor, to cause the at least one processor to perform operations comprising:

displaying, to a user of an instant messaging system, a graphical user interface comprising a window that includes a contacts list listing identifiers corresponding to multiple co-users of an instant messaging service;

monitoring when a message of type different from an instant message is received from a first one of the co-users;

determining a total number of messages of a different type sent by the first one of the co-users to the user that remain unattended by the user; and displaying, within the window that includes the contacts list and in association with the identifier corresponding to the first co-user, a graphical element that indicates that one or more unattended messages of a different type have been sent by the first co-user to the user and remain unattended by the user.

18. The non-transitory, computer-readable storage medium of claim 17, wherein the instructions further cause the at least one processor to:

display, in response to selection of the graphical element by the user, an indication of the number of messages of a different type that remain unattended by the user.

19. The non-transitory, computer-readable storage medium of claim 17, wherein the instructions further cause the at least one processor to:

activate, in response to selection of the graphical element by the user, an application to attend to the one or more unattended messages.

20. The non-transitory, computer-readable storage medium of claim 17, wherein the different types of messages include at least one type selected from the group consisting of email message, voicemail message, telephone call, and calendar event.

21. The non-transitory, computer-readable storage medium of claim 17, wherein:

monitoring when a message of type different from an instant message is received from a first one of the co-users comprises monitoring when an email message is received from a first one of the co-users;

determining a total number of messages of a different type sent by the first one of the co-users to the user that remain unattended comprises determining a total number of email messages sent by the first one of the co-users to the user that remain unattended by the user; and displaying a graphical element that indicates that one or more unattended messages of a different type have been sent by the first co-user to the user and remain unattended by the user comprises displaying a graphical element that indicates that one or more email messages have been sent by the first co-user to the user and remain unattended by the user.

22. The non-transitory, computer-readable storage medium of claim 17, wherein:

monitoring when a message of type different from an instant message is received from a first one of the co-users comprises monitoring when a voicemail message is received from a first one of the co-users;

determining a total number of messages of a different type sent by the first one of the co-users to the user that remain unattended comprises determining a total number of voicemail messages received by the user from the first co-user that remain unattended by the user; and displaying a graphical element that indicates that one or more unattended messages of a different type have been sent by the first co-user to the user and remain unattended by the user comprises displaying a graphical element that indicates that one or more voicemail messages have been received by the user from the first co-user and remain unattended by the user.

23. The non-transitory, computer-readable storage medium of claim 17, wherein:

monitoring when a message of type different from an instant message is received from a first one of the co-users comprises monitoring when a telephone call is received from a first one of the co-users;

determining a total number of messages of a different type sent by the first one of the co-users to the user that remain unattended comprises determining a total number of telephone calls received by the user from the first co-user that remain unattended by the user; and displaying a graphical element that indicates that one or more unattended messages of a different type have been sent by the first co-user to the user and remain unattended by the user comprises displaying a graphical element that indicates that one or more telephone calls have been received by the user from the first co-user and remain unattended by the user.

24. The non-transitory, computer-readable storage medium of claim 17, wherein:

monitoring when a message of type different from an instant message is received from a first one of the co-users comprises monitoring when a calendar event is received from a first one of the co-users;

determining a total number of messages of a different type sent by the first one of the co-users to the user that remain unattended comprises determining a total number of calendar events sent by the first one of the co-users to the user that remain unattended by the user; and displaying a graphical element that indicates that one or more unattended messages of a different type have been sent by the first co-user to the user and remain unattended by the user comprises displaying a graphical element that indicates that one or more calendar events have been sent by the first co-user to the user and remain unattended by the user.

\* \* \* \* \*